United States Patent
Wolosuk

(10) Patent No.: US 8,316,789 B2
(45) Date of Patent: Nov. 27, 2012

(54) SHIELDED MEAT TEMPERATURE SENSING DEVICE

(76) Inventor: Susan M. Wolosuk, Yale, VA (US)

(*) Notice: Subject to any disclaimer, the term of this patent is extended or adjusted under 35 U.S.C. 154(b) by 193 days.

(21) Appl. No.: 12/854,522

(22) Filed: Aug. 11, 2010

(65) Prior Publication Data
US 2012/0039355 A1 Feb. 16, 2012

(51) Int. Cl.
G01K 11/12 (2006.01)
G01K 13/00 (2006.01)

(52) U.S. Cl. .......... 116/216; 374/155; 374/162

(58) Field of Classification Search .......... 116/216, 116/221; 374/155, 161, 162; 99/342, 343, 99/344; D10/52, 57
See application file for complete search history.

(56) References Cited

U.S. PATENT DOCUMENTS

| | | | | |
|---|---|---|---|---|
| 2,951,764 A * | 9/1960 | Chase | | 426/88 |
| 3,877,411 A * | 4/1975 | MacDonald | | 116/207 |
| 4,137,769 A * | 2/1979 | Parker | | 374/134 |
| 4,325,254 A * | 4/1982 | Svacina et al. | | 607/114 |
| 4,445,787 A * | 5/1984 | Parker | | 374/141 |
| 4,580,909 A * | 4/1986 | McIntosh | | 374/141 |
| 4,738,549 A * | 4/1988 | Plimpton | | 374/208 |
| D301,842 S * | 6/1989 | Pepitone | | D10/57 |
| 5,380,092 A * | 1/1995 | Alain | | 374/160 |
| 5,575,563 A * | 11/1996 | Chiu et al. | | 374/141 |
| 5,622,137 A | 4/1997 | Lupton, Jr. et al. | | |
| 5,685,641 A | 11/1997 | Ribi | | |
| 5,918,981 A | 7/1999 | Ribi | | |
| 6,065,391 A * | 5/2000 | Archard et al. | | 99/342 |
| 6,176,197 B1 | 1/2001 | Thompson | | |
| 6,700,100 B2 * | 3/2004 | Lerner | | 219/445.1 |
| 6,942,377 B1 | 9/2005 | Goldstein | | |
| 2003/0147450 A1 | 8/2003 | Witonsky et al. | | |
| 2008/0072813 A1 | 3/2008 | Parker et al. | | |
| 2009/0217864 A1 * | 9/2009 | Stewart et al. | | 116/216 |

FOREIGN PATENT DOCUMENTS

DE 3802516 A1 * 8/1989
GB 2318870 A * 5/1998

* cited by examiner

Primary Examiner — R. A. Smith
(74) Attorney, Agent, or Firm — Dale J. Ream

(57) ABSTRACT

A temperature sensing device includes a casing having top and bottom walls with at least one wall connecting the top and bottom walls so that the casing is sealed, the top, bottom, and side walls being constructed of a heat resistant material. The sensing device includes a probe having a first portion attached to the casing bottom wall and extending downwardly and a second portion situated inside the interior space, the first and second portions being operatively connected to one another to transfer thermal energy therebetween. The probe second portion is coated with a thermochromic material that is color responsive to temperature. At least one wall of the casing defines an aperture that is covered by a material that is heat resistant, the probe second portion being viewable through the aperture for determining a temperature of an article of meat.

13 Claims, 3 Drawing Sheets

SHIELDED MEAT TEMPERATURE SENSING DEVICE

BACKGROUND OF THE INVENTION

This invention relates generally to temperature sensing devices and, more particularly, to a temperature sensing device that may be left in an article of meat while cooking and which a visually indicates a meat temperature without accuracy being influenced by ambient air temperatures.

Meat thermometers are frequently used both in restaurants and at home for determining if a piece of meat has been cooked adequately, completely, or to a specific temperature. For accurate operation, all thermometers require that the portion of the device that is doing the actual temperature sensing be inside and completely surrounded by the meat being evaluated. If any part of the sensing device, i.e. the thermometer shaft is outside the meat, an inaccurate reading is likely in that the measurement may be influenced by the temperature of the ambient air surrounding the shaft rather than the meat itself.

Various devices have been proposed in the art for sensing the temperature of a meat product and for visually indicating the temperature to a user. Although assumably effective for their intended purposes, a consistent limitation of these proposals is that the temperature sensor must be inserted and read repeatedly. As with traditional meat thermometers, repeated insertion and removal of the thermometer introduces the possibility of introducing bacteria to the food product.

Therefore, it would be desirable to have a meat temperature sensing device that may be left in the food product through an entire cooking process so as to eliminate the potential for introducing bacteria as a result of multiple thermometer insertions. Further, it would be desirable to have a meat temperature sensing device that allows the sensing element to be fully inserted into a meat product while still visually indicating a temperature clearly to a user. In addition, it would be desirable to have a meat temperature sensing device that measures only the actual temperature of the meat and is not influenced by the temperature of surrounding ambient air.

SUMMARY OF THE INVENTION

A temperature sensing device for use in detecting and displaying an internal temperature of an article of meat includes a casing that includes opposed top and bottom walls and having at least one side wall connecting the top and bottom walls so that the casing defines an interior space and is sealed, the top, bottom, and side walls being constructed of a heat resistant material. The sensor includes a probe having a first portion attached to the casing bottom wall and extending downwardly and a second portion situated inside the interior space, the first and second portions being operatively connected to transfer thermal energy therebetween. The probe second portion is coated with a thermochromic material that is color responsive to temperature. At least one wall of the casing defines an aperture that is covered by a material that is heat resistant, the probe second portion being viewable through the aperture for determining a temperature of an article of meat.

Therefore, a general object of this invention is to provide a meat temperature sensing device that detects and displays the temperature of a piece of meat.

Another object of this invention is to provide a meat temperature sensing device, as aforesaid, that may be inserted into and left in a piece of meat during an entire cooking event.

Still another object of this invention is to provide a meat temperature sensing device, as aforesaid, having a thermochromic probe that visually indicates a temperature.

Yet another object of this invention is to provide a meat temperature sensing device, as aforesaid, having a heat resistant housing surrounding the thermochromic portion of the probe so as to inhibit sensing the temperature of surrounding ambient air.

A further object of this invention is to provide a meat temperature sensing device, as aforesaid, that is easy to use and cost-effective to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
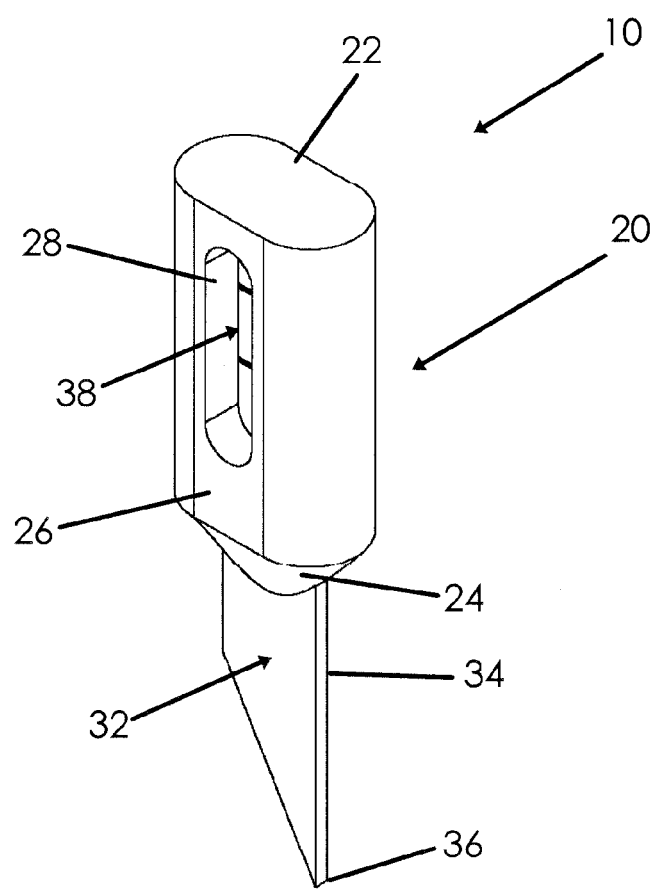
FIG. 1 is a perspective view of a thermochromic meat temperature sensing device according to a preferred embodiment of the present invention.
Figure 2:
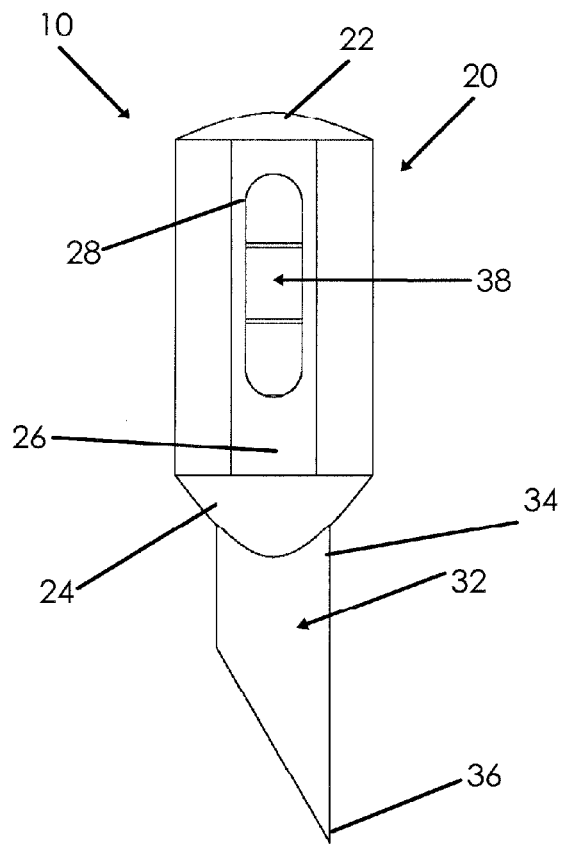
FIG. 2 is a front view of the sensing device as in FIG. 1.
Figure 3:
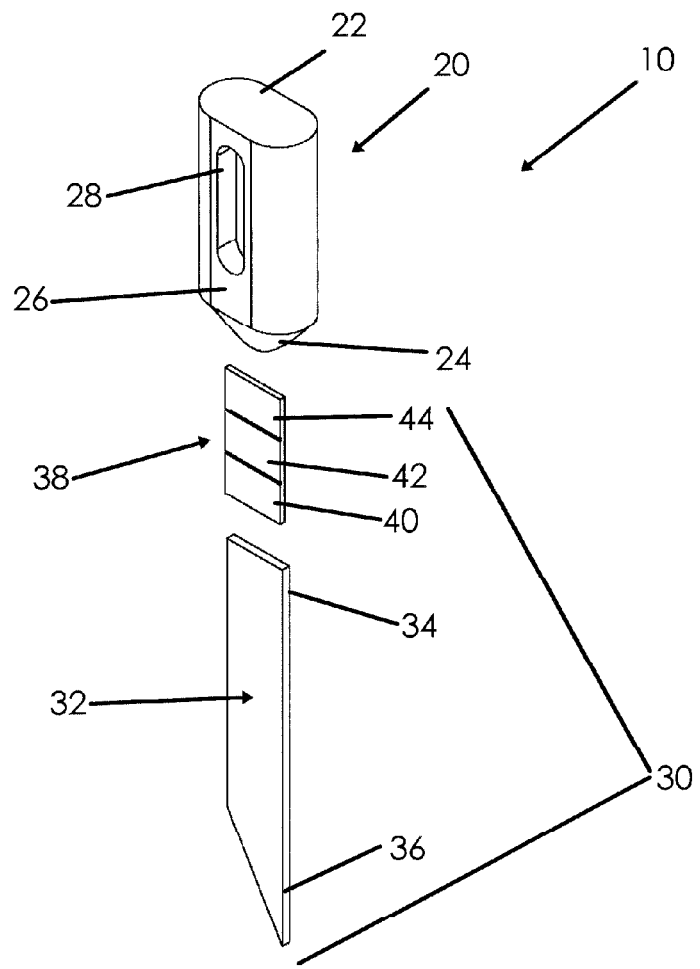
FIG. 3 is an exploded view of the sensing device as in FIG. 1.

A thermochromic meat temperature sensing device according to a preferred embodiment of the present invention will now be described with reference to FIGS. 1 to 3 of the accompanying drawings. The temperature sensing device 10 includes a casing 20 and a temperature probe 30.

The casing 20 includes opposed top 22 and bottom 24 walls and at least one side walls connecting the top 22 and bottom 24 walls. In other words, the casing 20 may include a continuous side wall characteristic of a cylindrical configuration although the casing 20 may have a configuration having multiple side walls. In any case, the casing walls are connected to one another so as to define an interior space that is sealed and does not allow air therein to mingle with ambient air outside the casing 20. The walls of the casing are constructed of a heat resistant material that can withstand strong heat energy for a substantial period of time, it being understood that any material may eventually be overcome by heat energy. At least one of the casing walls, such as a side wall 26 may define an aperture 28 through which a user may be able to view contents within the interior space. The aperture 28 is preferably covered by a substantially transparent heat resistant material. Alternatively, one or more casing walls may be completely constructed of a substantially transparent heat resistant material.

The temperature probe 30 includes first 32 and second 38 portions. The first portion 32 may include a proximal end 34 attached to the bottom wall 24 of the casing 20 and a distal end 36 extending away from the casing bottom wall 24. Preferably, the distal end 36 includes a generally pointed configuration that enhances entry into a piece of meat. As shown in the accompanying drawings, the distal end 36 may include an angled configuration such that the longest edge of the distal end 36 makes initial contact with a meat product and then more of the distal end 36 enters the meat as the probe 30 is inserted therein.

The second portion 38 of the probe 30 is operatively connected to the first portion 32 and extends into the interior space of the casing 20. Preferably, the first 32 and second 38 portions have an integral construction. The first 40 and second 42 portions of the probe 30 are preferably constructed of a metal material, such as stainless steel, so that heat sensed by the first portion 32 is easily and consistently transferred to the second portion 38. It is important to reiterate that a temperature detected by the first portion 32 while inserted completely in an article of meat is accurately transferred to the second portion 38 in that the second portion 38 is protected from heated ambient air by the heat resistant casing 20 in which it is situated.

The second portion 38 of the probe 30 includes at least one section of thermochromic material although a plurality of sections of thermochromic material is preferred. The thermochromic material may be a thermochromic paint that changes to a predetermined color when its temperature reaches a predetermined threshold temperature. For example, the paint may have one color and a response temperature of 135 degrees Fahrenheit at which point it changes to another color. If multiple thermochromic sections are utilized, such as a first 40, second 42, and third 44 section, each section is spaced apart from any other section so that there is no overlap and so that color changes are easy to view and interpret accurately (FIG. 3). Further, each section includes a response temperature different from a response temperature of any other section. For example, the second 42 thermochromic section has a response temperature that is larger than a response temperature of the first 40 thermochromic section. Similarly, the third 44 thermochromic section has a response temperature that is larger than a response temperature of the second 42 thermochromic section. The response temperatures may be associated with temperatures that are indicative of meat that is "rare," "medium rare," and "well done," respectively. It is understood that the thermochromic sections of the second portion 38 of the probe 30 are positioned within the casing 20 so as to be visible through the casing aperture 28.

In use, one or more thermochromic sensor devices 10 may be inserted into a meat product while it is being cooked so as to determine the temperature of the meat substantially at the location of insertion. In other words, multiple sensor devices 10 may be inserted at spaced apart locations of the same article of meat. The devices 10 may remain in the meat during the entire time of cooking as the second portion 38 of the probe 30 having one or more thermochromic sections is situated inside the heat resistant casing 20 as described above. A user may visually inspect the probe second portion 38 repeatedly during cooking to determine when the meat has been cooked to a desired level.

It is understood that while certain forms of this invention have been illustrated and described, it is not limited thereto except insofar as such limitations are included in the following claims and allowable functional equivalents thereof.

The invention claimed is:

1. A temperature sensing device for use in detecting and displaying an internal temperature of an article of meat, comprising:
   a casing that includes opposed top and bottom walls and having at least one side wall connecting said top and bottom walls so that said casing defines an interior space and is sealed, said top, bottom, and side walls being constructed of a heat resistant material;
   a probe having a first portion attached to said casing bottom wall and extending downwardly and a second portion situated inside said interior space, said first and second portions being operatively connected so as to transfer thermal energy therebetween;
   wherein said probe second portion is coated with a thermochromic material that is color responsive to temperature;
   wherein:
   said casing side wall defines an aperture that is covered by a transparent material; and
   said probe second portion is situated so as to be viewable through said aperture.

2. The temperature sensing device as in claim 1, wherein:
   said casing top wall defines an aperture that is covered by a transparent material; and
   said probe second portion is situated so as to be viewable through said aperture.

3. The temperature sensing device as in claim 1, wherein said casing is constructed of a temperature resistant material that is substantially transparent.

4. The temperature sensing device as in claim 1, wherein said first portion of said probe includes proximal and distal ends relative to said casing, said distal end having a generally pointed configuration so that said probe first portion may be inserted easily into the article of meat.

5. The temperature sensing device as in claim 1, wherein said first portion of said probe includes proximal and distal ends relative to said casing, said distal end having a generally angled configuration so that said probe first portion may be inserted easily into the article of meat.

6. The temperature sensing device as in claim 1, wherein said thermochromic material on said probe second portion includes a plurality of thermochromic materials, each thermochromic material being spaced apart from any other of said plurality of thermochromic materials and having a response temperature different from a response temperature of any other of said plurality of thermochromic materials.

7. The temperature sensing device as in claim 6, wherein a first said thermochromic material has a response temperature indicative of "rare" meat, a second said thermochromic material has a response temperature indicative of "medium rare" meat, and a third said thermochromic material has a response temperature indicative of "well done" meat.

8. The temperature sensing device as in claim 7, wherein:
   said response temperature of said second thermochromic material is greater than said response temperature of said first thermochromic material; and
   said response temperature of said third thermochromic material is greater than said response temperature of said second thermochromic material.

9. A temperature sensing device for use in detecting and displaying an internal temperature of an article of meat, comprising:
   a casing that includes opposed top and bottom walls and having at least one side wall connecting said top and bottom walls so that said casing defines an interior space and is sealed, said top, bottom, and side walls being constructed of a heat resistant material;
   a probe having a first portion attached to said casing bottom wall and extending away, and a second portion situated inside said interior space, said first and second portions being operatively connected to transfer thermal energy therebetween;
   wherein:
   said probe second portion is coated with a plurality of thermochromic materials, each thermochromic material being spaced apart from any other of said plurality of thermochromic materials and having a response temperature different from a response temperature of any other of said plurality of thermochromic materials;

at least one wall of said casing includes a section that is transparent; and said probe second portion is positioned in said interior space so as to be visible through said transparent section.

10. The temperature sensing device as in claim 9, wherein:

said plurality of said thermochromic materials includes first, second, and third thermochromic material, each having a respective response temperature;

said response temperature of said second thermochromic material is larger than said response temperature of said first thermochromic material; and said response temperature of said third thermochromic material is larger than said response temperature of said second thermochromic material.

11. The temperature sensing device as in claim 10, wherein said first portion of said probe includes proximal and distal ends relative to said casing, said distal end having a generally pointed configuration so that said probe first portion may be inserted easily into the article of meat.

12. The temperature sensing device as in claim 10, wherein said first portion of said probe includes proximal and distal ends relative to said casing, said distal end having a generally angled configuration so that said probe first portion may be inserted easily into the article of meat.

13. The temperature sensing device as in claim 10, wherein said thermochromic material is paint.

* * * * *